Dec. 20, 1949  E. L. SCHOFIELD ET AL  2,492,068
RETRACTABLE VEHICLE STEP
Filed March 22, 1948  2 Sheets-Sheet 1
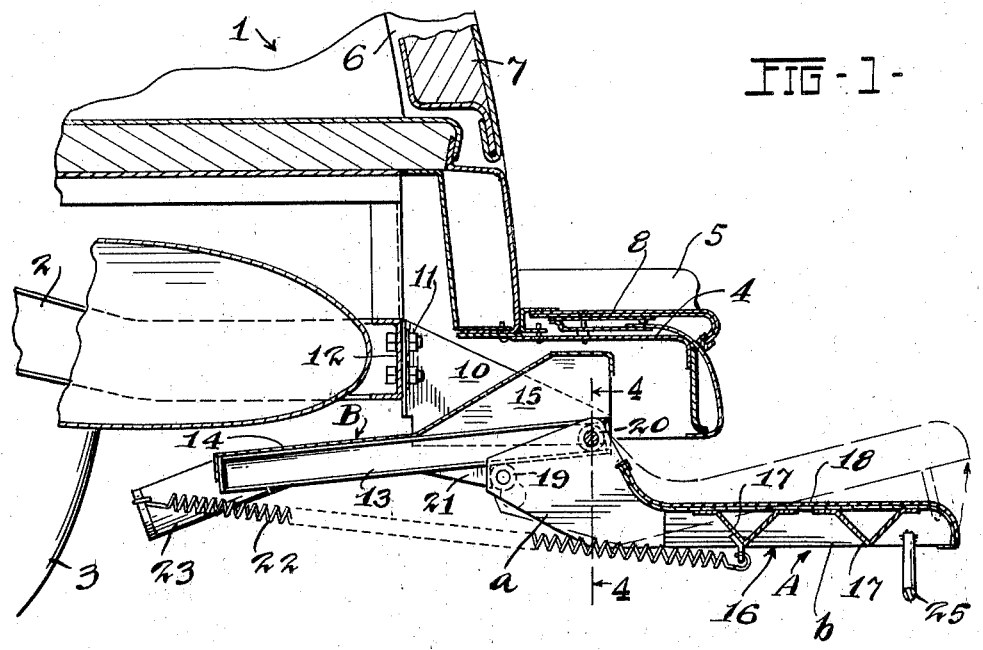
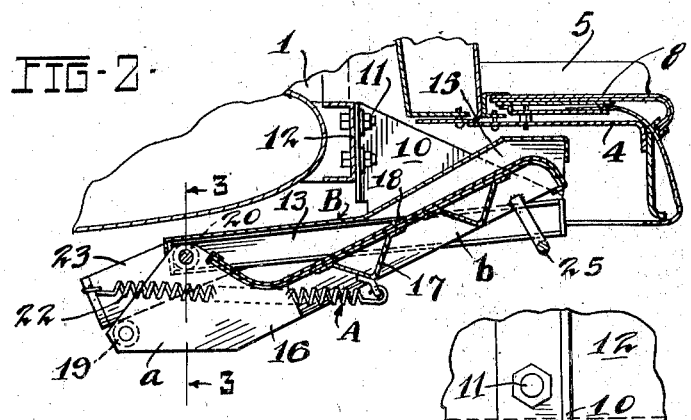
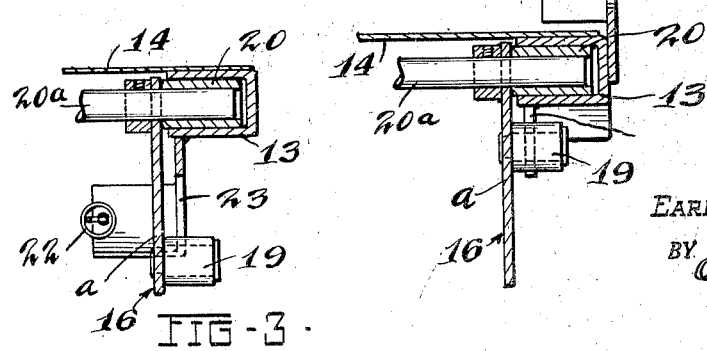
INVENTORS,
EARL L. SCHOFIELD
GEORGE L. RUNKLE.
BY
Owen & Owen
ATTYS.

Dec. 20, 1949     E. L. SCHOFIELD ET AL     2,492,068
RETRACTABLE VEHICLE STEP
Filed March 22, 1948     2 Sheets-Sheet 2
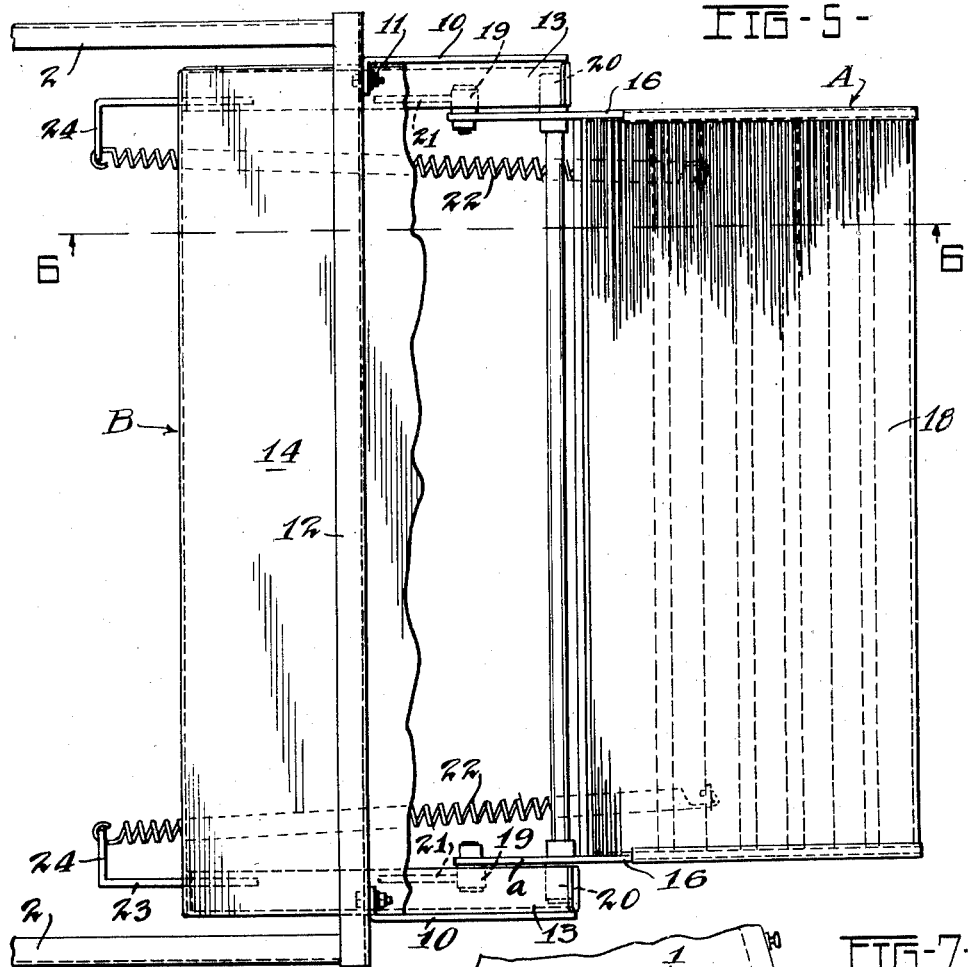
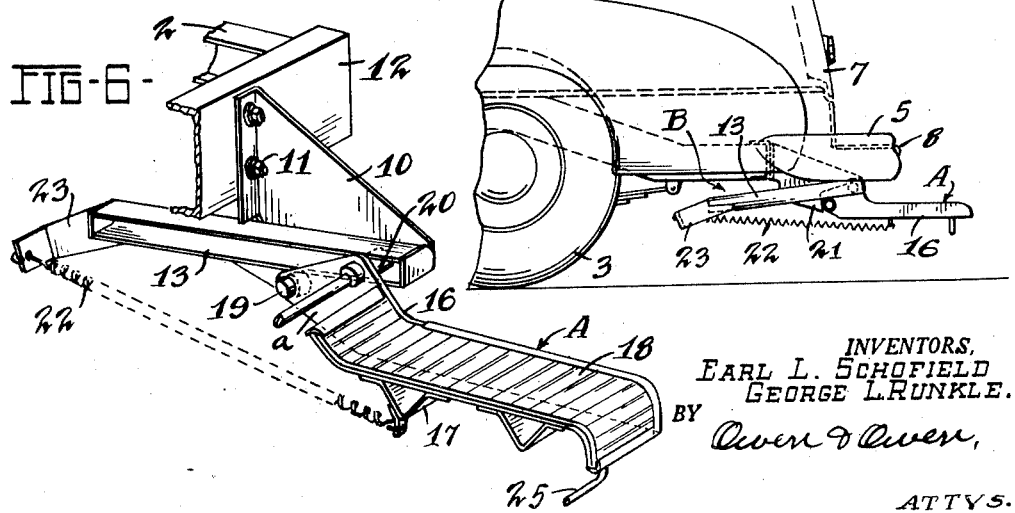
INVENTORS,
EARL L. SCHOFIELD
GEORGE L. RUNKLE.
BY Owen & Owen,
ATTYS.

Patented Dec. 20, 1949

2,492,068

UNITED STATES PATENT OFFICE 2,492,068

RETRACTABLE VEHICLE STEP

Earl L. Schofield, Rockford, Ill., and George Laverne Runkle, Lima, Ohio, asignors to Superior Coach Corporation, Lima, Ohio, a corporation of Ohio Application March 22, 1948, Serial No. 16,264

7 Claims. (Cl. 280—166)

This invention relates to retractable steps for vehicles, and has for its primary object the provision of a simple and efficient step of this character adapted particularly for use in connection with the rear ends of funeral and invalid automobiles.

Another object of the invention is the provision of simple and efficient means for mounting a step of this character and attaching it to the chassis or under frame structure of an automobile for projecting and retracting movements under the rear end of the vehicle body.

Another object of the invention is the provision of means for protecting the step from dust and dirt when in retracted position.

Further objects and advantages of the invention will be apparent from the following detailed description, and from the accompanying drawings, illustrating one embodiment of the invention, in which—

Fig. 1 is a vertical longitudinal section of a fragmentary rear end portion of a hearse body with a step embodying the invention in similar section associated therewith and shown in projected position; Fig. 2 is a similar view with the step in retracted position; Fig. 3 is an enlarged fragmentary section on the line 3—3 in Fig. 2; Fig. 4 is an enlarged fragmentary section on the line 4—4 in Fig. 1; Fig. 5 is a plan of the step unit and its mounting means in mounted position, with the step projected and with a portion of the guard housing broken away; Fig. 6 is a section of the unit taken on the line 6—6 in Fig. 2 and shown in perspective with parts broken away, and Fig. 7 is a reduced side view of a portion of a rear end of an automobile with a step embodying the invention associated therewith and in extended position.

Referring to the drawings, I designates the body of an automobile of the hearse or ambulance type, the lower rear end portion only of which is shown, 2 the chassis frame side bars projecting rearwardly of the rear supporting wheels 3, and 4 the rear bumper ledge of the body that is guarded, in the present instance, at its end portion by reinforcing bumper members 5. The body I has a rear door opening 6 closed by a door 7 and below this on the ledge 4 is mounted a step 8, which, however, forms no part of the present invention.

The retractable step comprising the present invention is designated A, and the means supporting and guiding such step for protracting and retracting movement and which serves as a protecting guard therefor when in retracted position is designated B.

The guard B is mounted beneath the rear end portion of the automobile body I and is rigidly attached by side bracket members 10 and bolts 11 to a cross-bar 12 rigidly connecting the rear end portions of the chassis side bars 2. The guard B is preferably slightly inclined upwardly and rearwardly from a horizontal lengthwise of the vehicle with its rear end terminating under the bumper ledge 4. The guard at each side edge includes a rigid frame rail 13 of U-form, with its channel facing inwardly to form a roller track, as hereinafter described, and its ends closed. These bars are connected and covered by a top sheet 14 which cooperates with the rails 13 to form a mud guard or housing for protecting the step 8 when retracted. The sheeting 14 at the rear end portion of the guard is upwardly and rearwardly inclined to form a top pocket 15 at such end for the purpose hereinafter described.

A step A comprises opposing side bars 16, 16, paralleling the guard bars 13 and a structure 18 resting on the bars 16 and 17 to form a step. Each side bar 16 at its forward or inner end has an enlargement a extending upwardly and forwardly from its horizontally extending step-forming portion b, and this portion a carries two outwardly projecting rollers 19 and 20, with the roller 19 located forward and below the horizontal plane of the roller 20 when the step is in horizontal position as shown in Fig. 1. The rollers 20 are mounted on the ends of a cross-shaft 20ª connecting the two side bars 16 and project within the channels of the respective guard bars 13 to roll on the bottom flanges thereof, while the rollers 19 project under said bars to roll against and along the under sides of said flanges. It is thus apparent that the cooperating action of the rollers 19 and 20 on the guard rails 12 will support the step A in horizontal position when projected. The step is retained in projected position by a check or stop lug 21 on the under side of each rail 13 engaging the respective roller 19, the lug being rearwardly and downwardly tapered to permit the roller to freely pass thereunder when the step is being moved outward to operative position. The rollers are released from the stop lugs by tilting the step upward as shown by dotted lines in Fig. 1.

The step A is normally held in retracted position by a coiled contractile spring 22 adjacent to each side edge thereof, each spring extending from one of the cross-bars 17 to an extension arm 23 at the forward end of the adjacent guard rail 13. The bottom surfaces of the arms 23 form rearward extensions of the under surfaces of the guard rails 13 in the paths of the respective rollers 19 and incline downwardly and forwardly from said rail surfaces so that said rollers in traveling down the surfaces cause a rocking of the step about the axis of the rollers 20 as a fulcrum and a consequent raising of the rear end of the step into protected position within the top pocket 15 of the guard B.

The step A at the under side of its rear or free end portion is provided with a handle-bar 25 which extends crosswise of the step and is connected at its ends to the side bars 16. In pulling the step out, the operator may easily reach under the body ledge 4 of the vehicle body and grasp the handle-bar 25.

It is apparent that when the step A is not in use, it may be disposed in retracted position within the guard B and protected thereby from mud and dirt that may be thrust up from the wheels, and that to project the step into usable position it is only necessary for the operator or attendant to reach under the rear edge of the vehicle body, grasp the handle 25 and pull it rearward against the tension of the springs 22. As the rollers 19 travel rearward on the rails 13 and their extensions 23, the step will be caused to assume a horizontal position and will be retained in projected position by the rollers 19 passing under and engaging the stop sides of the lugs 21.

We wish it understood that our invention is not limited to any specific construction, arrangement or form of the parts, as it is capable of numerous modifications and changes without departing from the spirit of the claims.

Having thus described our invention, what we claim as new, and desire to secure by United States Letters Patent, is:

1. A retractable vehicle step structure comprising a pair of rails for attaching in transversely opposing spaced relation to the under side of a vehicle and disposed adjacent to and directed lengthwise toward an edge thereof, and a step guided at its inner end by and between said rails for retraction under the associated vehicle and for projection outwardly from under the adjacent edge of the vehicle to usable position, said rails consisting of channel bars with their channels facing inwardly and having a cam portion at the inner end thereof and the step having two pairs of longitudinally spaced rollers projecting laterally from its inner end portion and cooperating with the rail channels to guide the movements of the step with one roller of each pair bearing downwardly on the rail and serving as a fulcrum about which the step has limited tilting movements and the other roller of each pair bearing upwardly and cooperating with the rails to hold the step level during a portion of its movement and with the cam portion of the rails to cause predetermined tilting of the step during a portion of such movement.

2. A retractable vehicle step structure comprising a guard for attachment under a vehicle adjacent to an edge thereof, said guard having transversely spaced longitudinally extending guide rails and a cam portion adjacent to their inner ends, and a step guided for movements by said rails lengthwise thereof and adapted to be retracted in protected position under the guard or projected lengthwise of the guard from under an adjacent edge of the vehicle, said step having rollers cooperating with the rails to guide the longitudinal movements of the step and some cooperating with the cam portions to cause an upward tilting of the outer end portion of the step in protected position within the guard when retracted therebeneath.

3. In a structure of the class described, a guard adapted to be mounted under the rear end portion of a vehicle and having a raised rear end portion and longitudinally extending rails with inwardly facing channels, said rails having downwardly and forwardly extending extensions at their forward ends, a step guided for movements by said guard rails and having opposing side bars with upwardly extending forward end enlargements, a pair of rollers projecting laterally from the enlargement of each side bar with one roller of each pair engaging in the channel of the associated guide rail and the other roller of each pair disposed in advance of and below the horizontal plane of the first roller and traveling on the under side of the bar and its extension when the step is moved lengthwise of the guard, said rollers and rails cooperating to guide the step for horizontal projecting and retracting movements and said forward rollers cooperating with said extensions to cause a predetermined upward tilting of the step within the guard when in retracted position.

4. An arrangement as called for in claim 3, together with spring means connecting the step and guard for normally retaining the step in retracted position, and stop means on the rails for cooperating with the forward rollers to releasably retain the step in projected position.

5. In a step structure of the class described, a step member having an upturned inner end portion, guide rollers projecting from each side of said end portion in spaced relation longitudinally of the step member, and a guide means having relatively angled portions attached to the under side of a vehicle adjacent to an edge thereof and cooperating with the under sides of some of said rollers and with the upper sides of other of said rollers to guide the movements of the step member for predetermined longitudinal movements and prevent tilting thereof and to cause a predetermined tilting of the step member relative to the guide means during the last portion of its inward movement.

6. An arrangement as called for in claim 5 together with spring means connecting the step and guard for normally retaining the step member in retracted position, and means coacting with some of said rollers for releasably holding the step member in extended position.

7. A retractable step structure for vehicles, comprising substantially horizontally disposed guide means, with a downwardly inclined rear extension for attaching to the under side of a vehicle and disposed adjacent to and directed lengthwise toward an edge thereof, a step having at its inner end an upturned portion, two sets of rolls on said upturned portion for traveling engagement on said guide means to permit withdrawal and retracting movements of the step and cooperating with the guide means to support the step in horizontal position, one set of rolls being movable for a portion of the retracting movement of the step along said inclined extension to effect an upward tilting of the step relative to the guide means when said last-mentioned rolls are traveling down said inclined portions, the tilting movement of the step being about the other set of rolls as a fulcrum, and means for holding the step in protracted usable position.

EARL L. SCHOFIELD.
GEORGE LAVERNE RUNKLE.

REFERENCES CITED

The following references are of record in the file of this patent:

UNITED STATES PATENTS

| Number | Name | Date |
| --- | --- | --- |
| 1,148,356 | Chickering | July 27, 1915 |
| 1,183,269 | Beck | May 16, 1916 |
| 1,184,383 | Roebuck | May 23, 1916 |
| 1,270,086 | Wochner | June 18, 1918 |
| 2,149,296 | Kelberer | Mar. 7, 1939 |
| 2,153,945 | Thelander | Apr. 11, 1939 |